United States Patent
Doerscheln

[15] 3,691,727
[45] Sept. 19, 1972

[54] MULTIPLE SHEET DISPENSING APPARATUS

[72] Inventor: Fritz Doerscheln, Rochester, N.Y.

[73] Assignee: Heat Sealing Equipment Manufacturing Company, Cleveland, Ohio

[22] Filed: Feb. 14, 1966

[21] Appl. No.: 527,265

[52] U.S. Cl. ............... 53/390, 226/128, 242/55.3
[51] Int. Cl. ....................................... B65b 67/00
[58] Field of Search ........ 53/219, 389, 390; 146/214; 225/34; 226/127, 128; 242/55.3; 312/39, 40, 41

[56] References Cited

UNITED STATES PATENTS

| | | |
|---|---|---|
| 379,444 | 3/1888 | Booth et al. ................ 225/34 |
| 473,825 | 4/1892 | Crawford .................. 242/55.3 |
| 1,463,717 | 7/1923 | Munn ..................... 53/219 X |
| 2,593,325 | 4/1952 | Mathews ..................... 53/390 |
| 2,948,451 | 8/1960 | Swanson .................. 312/39 X |
| 3,176,443 | 4/1965 | Klamp ........................ 53/390 |
| 3,298,265 | 1/1967 | Millican et al. .......... 53/390 X |

*Primary Examiner*—Leonard D. Christian
*Attorney*—Cumpston, Shaw & Stephens

[57] ABSTRACT

Several rolls of different width plastic sheet are mounted on a frame and each sheet is led to a dispenser holder that includes a sheet-support bar, a check means for holding each sheet to its respective bar, and a pair of plates supporting the bars and check means for pivotal motion transversely of the sheets. The pivotal dispenser allows any desired sheet to be moved into position adjacent a guide roll for dispensing and wrapping. The device also includes a wrapping table, a hot wire cutter, a hot plate sealer, and a tag holder on each bar for receiving and holding the tag end of a cut-off sheet.

17 Claims, 6 Drawing Figures

INVENTOR
FRITZ DOERSCHELN
BY Crumpton & Shaw
ATTORNEYS

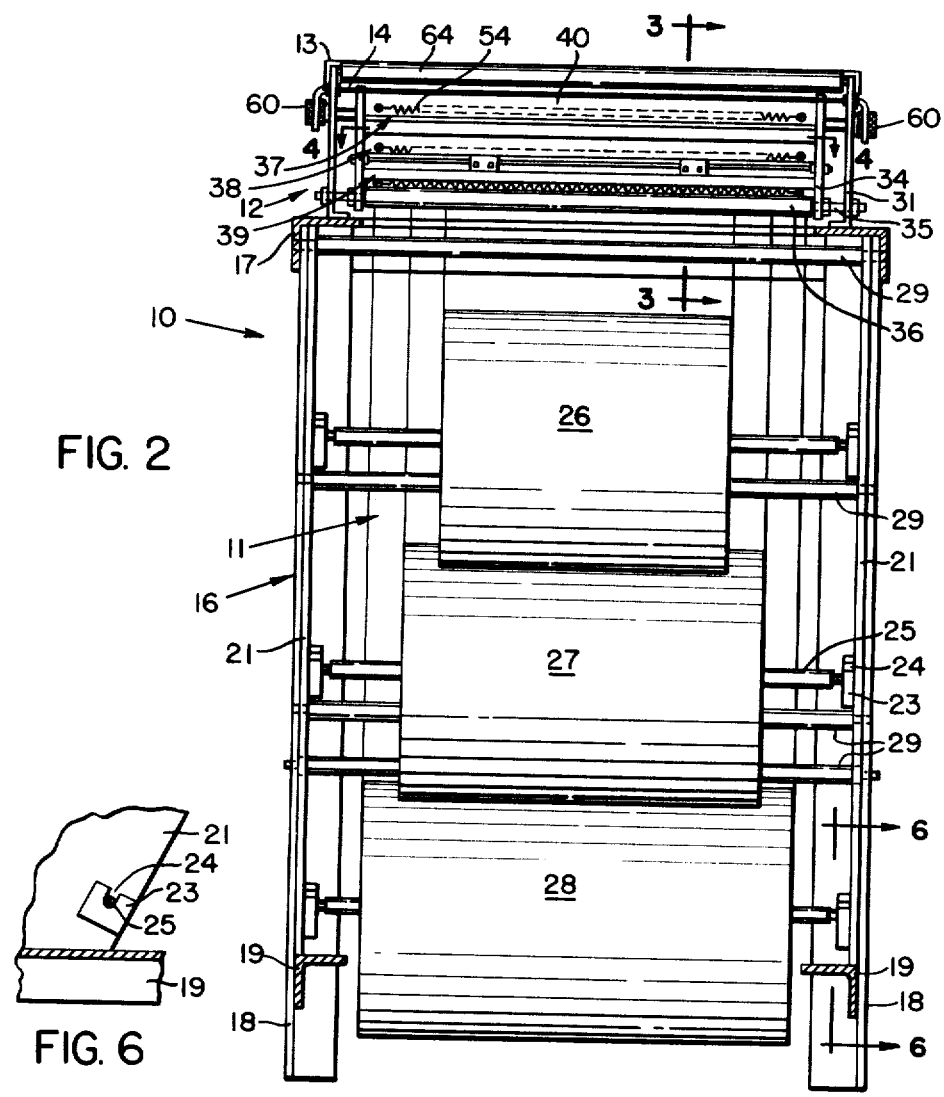

MULTIPLE SHEET DISPENSING APPARATUS

This invention relates to ways and means for storing and dispensing flexible sheeting and particularly thermoplastic films.

Thermoplastic films such as, for example, polyvinylidene chloride resin films, polypropylene resin films, cellophane and the like are being used more and more for packaging articles. For instance, in most supermarkets it is common practice to wrap individual trays of meat, fresh vegetables and fruits in thermoplastic films. In commercial laundries washed and ironed shirts are generally wrapped in thermoplastic films. This ever increasing use of thermoplastic films has led to wrapping apparatus for use during the wrapping operation.

One such apparatus has a frame on which is a generally horizontal wrapping table, a hot wire horizontally and transversely disposed in the region of the front of the wrapping table for cutting film, and in front of the hot wire and below the plane of the wrapping table a hot plate or heat sealer. The frame generally carries a roll of thermoplastic film with the roll being on a generally horizontal and transversely disposed axis of rotation. An example of this kind of apparatus is disclosed in U.S. Pat. No. 3,176,443, to Klamp.

In prior wrapping apparatus only one film can be stored and dispensed at one time. In an assembly line-like wrapping operation involving articles of different sizes and shapes, limitation of the apparatus to but one film is a disadvantage. It results in sorting out according to size or shape the articles to be wrapped, wrapping those articles of one size or shape with thermoplastic film of appropriate width, replacing the roll of film of that width with a roll of film of width suitable for articles of another size or shape, and then wrapping those articles. Instead of this procedure, two or more wrapping apparatuses have to be employed, one for each roll width. Still another alternative is to use film of just one width large enough for all of the articles, but this wastes film in the case of the smaller articles. Consequently, there has been a need for a wrapping apparatus capable of storing and dispensing films of more than one width.

An object of this invention is to provide such a wrapping apparatus.

A general object of this invention is to provide an apparatus for storing and dispensing a plurality of films.

These objects and such others as appear as this specification proceeds are achieved by this invention.

This invention, in summary, comprises a dispenser for at least two flexible sheets. The dispenser comprises sheet holding means for each of the sheets. Each of the sheet holding means permits the sheet to be manually pulled therethrough, but otherwise holds the sheet against the pull of gravity.

In a preferred, general embodiment of the invention, the dispenser is pivotally mounted on an axis for bringing a desired sheet held by the sheet holding means into a desired dispensing position. Included are means for pivoting the dispenser and means for establishing and maintaining the dispenser in a desired pivotal position until it is desired to change to another pivotal position.

This invention also comprises a storage and dispensing apparatus for storing a plurality of sheets and for dispensing the sheets. A preferred embodiment of the apparatus comprises a frame with means for mounting on axes of rotation at least two rolls of sheeting. Carried by the frame is a dispenser of this invention, having sheet holding means corresponding to each of the rolls of sheeting.

This invention, furthermore, includes a wrapping machine. The machine comprises a storage and dispenser apparatus of this invention and additionally carried by the frame of the apparatus a wrapping table, a hot wire cutter and a heat sealer.

This invention is further illustrated by the drawings which are a material part of these disclosures. In the drawings:

FIG. 2 is a sectioned front view of the embodiment of FIG. 1, which view has been taken as indicated by the off-set sectioning plane 2—2 in FIG. 1;

FIG. 4 is an enlarged, plan view of a sheet dispensing section of the sheet dispenser of FIG. 3, which view has been taken as indicated by the off-set viewing plane 4—4 in FIGS. 2 and 3 with a portion of the outer structure removed to reveal otherwise hidden structure;

Figure 1:
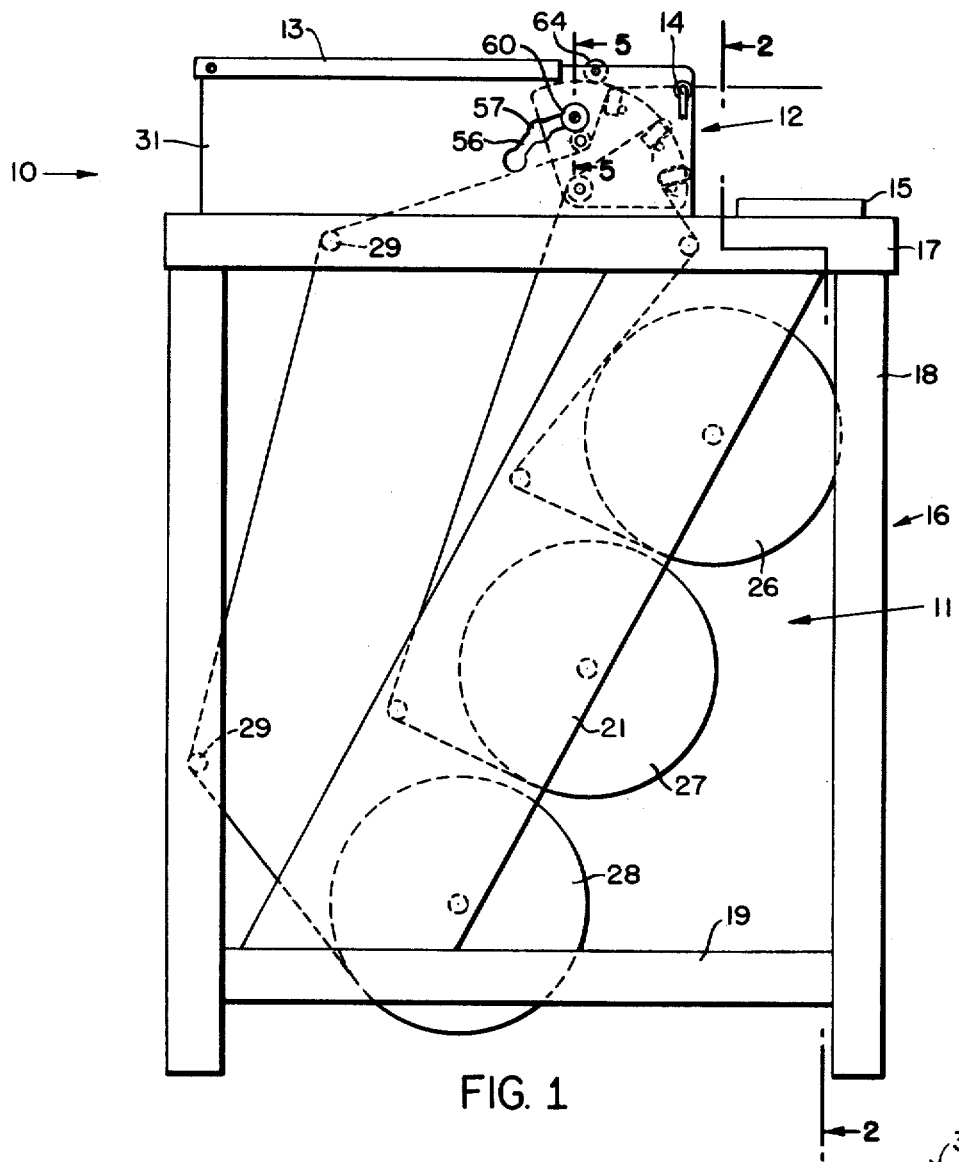
FIG. 1 is a side view of a preferred, specific embodiment of a wrapping machine of this invention.
Figure 5:
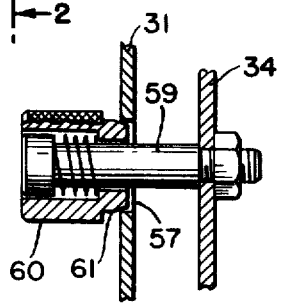

FIG. 5 is an enlarged sectional view of specific means employed to establish and maintain the pivotal position of the dispenser in the machine of FIG. 1, which view has been taken as indicated by the sectioning plane 5—5 in FIG. 1; and FIG. 6 is a longitudinal sectional view of the means in the machine of FIGS. 1 and 2 for mounting one end of a shaft for a roll of sheeting, which view has been taken as indicated by the sectioning plane 6—6 in FIG. 2.

STRUCTURE

More specifically, FIGS. 1 and 2 of the drawings disclose a multiple sheet wrapping machine 10. The machine has a roll storage structure 11, a sheet dispenser 12, a wrapping table 13, a hot wire cutter 14 and a heat sealer 15, all mounted on and carried by a frame 16. The frame has a top 17 with an opening therethrough under the sheet dispenser 12 and table 13, and also has legs 18 and longitudinal, leg connecting pieces 19.

The roll storage structure 11 (see FIG. 2) comprises a pair of supports 21, one on one side of the frame 16 and the other on the other side of the frame 16, both of which extend from the top 17 to the longitudinal, leg connector 19 on the corresponding side. Each support 21 carries a plurality of roll shaft journal blocks 23, the blocks being fastened to the supports in oppositely aligned pairs. Each block in the embodiment shown as as best illustrated in FIGS. 2 and 6 comprises a normally open slot 24 in which is rotatably and removably received one end of a transversely and horizontally disposed roll shaft 25. In the embodiment shown there are three rolls 26, 27 and 28 of thermoplastic films of different widths. Each roll is carried by roll shaft 25.

The roll storage structure 11 also comprises spacing rollers 29 transversely, horizontally and rotatably mounted on the frame 16. These spacing rollers are positioned so that film from each of the rolls in extending normally upwardly to the sheet dispenser 12 is spaced from the other rolls and films extending normally upwardly therefrom.

The top 17 of the frame comprises a pair of vertically oriented side panels 31 with one on one side of the frame and the other on the other side of the frame. Carried by front portions of the side panels 31 is the multiple sheet dispenser 12.

Figure 3:
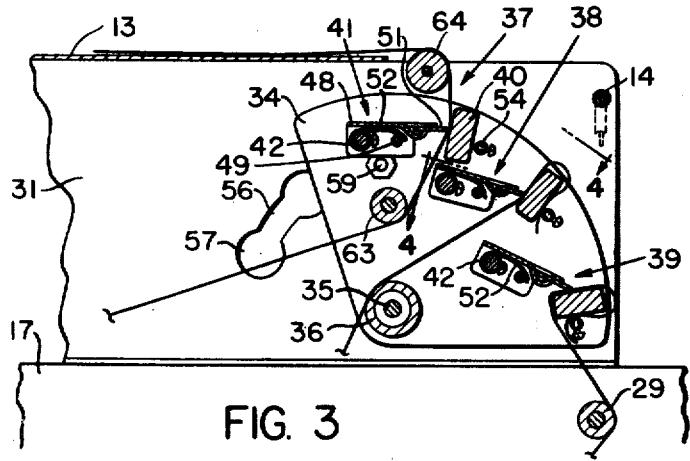
FIG. 3 is an enlarged, longitudinal section of the pivotable, sheet dispenser of the machine of FIGS. 1 and 2, which view has been taken as indicated by the sectioning plane 3—3 in FIG. 2.

The dispenser 12 comprises a pair of substantially identical side plates 34 which are normally transversely spaced and vertically disposed, and which are shaped like sectors (see FIG. 3). The side plates 34 in the region of their apices are fastened to an arbor 35 on a normally horizontal, transversely positioned pivotal axis. The arbor 35 extends outwardly from each plate in sliding fit into corresponding bores in the side panels 31. Between the side plates 34 and rotatably mounted on the arbor 35 is a first auxiliary spacing roller 36. Also between the side plates 34 are three, sheet holder assemblies 37, 38 and 39 (see FIG. 3). Each sheet holder assembly as best shown in FIGS. 3 and 4 comprises a sheet support bar 40 and a sheet check structure 41.

The sheet support bar 40 is normally horizontally disposed between the side plates 34 and fastened thereto. It preferably is rectangular in cross section and is positioned so that a major side is substantially in a plane of a radius from the pivotal axis of the dispenser 12 and so that it has a minor side which at the ends is close to the arcuate portions of the oppositely positioned side plates 34.

The sheet check structure 41 comprises a pivot rod 42 which is normally horizontally and transversely disposed between the side plates 34 and rearwardly of the sheet support bar 40. The pivot rod 42 is fastened to the side plates 34.

The sheet check structure 41, furthermore, comprises a pair of transversely spaced, U-shaped brackets 47 and 48. Pivot rod openings are provided through each leg of each of the brackets and the brackets are arranged with the pivot rod 42 passing through these openings in at least sliding fit. Also, there is a tie rod 49 extending through an opening in each leg of each of the brackets 47 and 48, and fastened to the outer leg of each bracket. The web of each of the U-shaped brackets 47 and 48 comprises a longitudinal extension 50 which extends part way toward the corresponding sheet support bar 40. Fastened to the web extension 50 is a resilient, semiflexible plate or press member 51. The press member 51 in each case is urged into contact with the normally upper, major surface of the corresponding sheet support bar 40, except when a sheet is between them, by a spiral compression spring 52. One end of the spring is fastened to the pivot rod 42 and the other end extends outwardly from the pivot rod and bears against the normally upper side of the tie rod 49.

Each sheet support bar 40 has a tag holder. In the embodiment shown (see FIG. 4) it is on the side of the support bar opposite the sheet support side. In the embodiment illustrated, it comprises a helical compression spring 54 which is fastened at each end to the sheet support bar 40. The spring 54 is normally in tension and along the length thereof bears against the sheet support bar 40, except where the tag or loose end of a sheet is tucked between it and the sheet support bar 40.

The dispenser 12 in the embodiment shown has three pivot positions corresponding to the three sheet holder assemblies 38, 39 and 40. Each position is selected so that when the dispenser is pivoted to it the corresponding sheet holder assembly is at the place desired for dispensing film. Accordingly, preferably both side panels 31 have arcuate slots 56 (see FIG. 1) with enlarged portions 57 corresponding to each of the three pivot positions. In addition, preferably each side plate 34 of the dispenser has (see FIG. 5) a stud member 59 fastened to the side plate and extending laterally in at least sliding fit through the corresponding arcuate slot 56. On the outer side of each side panel 31 each stud 59 carries a compression spring loaded, transversely slidable knob 60 having on the inner side thereof an annular flange 61 spring biased toward, and seatable in, each enlarged portion 57 of the arcuate slot. By pulling outwardly simultaneously on both knobs, the dispenser 12 is free to be pivoted from one pivot position to another. However, when one knob 60 is seated in an enlarged portion 57 of the arcuate slot 56, the dispenser 12 is held in place thereby.

In addition to the first auxiliary spacing roller 36, the dispenser can have additional auxiliary spacing rollers such as a second auxiliary spacing roller 63 (see FIG. 3) rotatably mounted on the side plates 34 and positioned transversely and normally horizontally between the first auxiliary spacing roller 36 and the axis of the studs 59.

The wrapping table 13 of the machine 10 has a generally flat, normally horizontally disposed surface. The table 13 is carried by the side panels 31 on top of the frame 16 with the front end of the table being in the region of the dispenser 12. In front of the table 13 and above the dispenser 12 at the desired, sheet dispensing place of the machine 10 is a guide roller 64. The guide roller 64 is transversely and normally horizontally disposed between the side panels 31 and is rotatably mounted thereon.

The hot wire cutter 14 comprises a resistance wire stretched between the side panels 31 and fastened to terminals mounted on the side panels in front of the guide rollers 64, but spaced therefrom, and above the dispenser 12.

The heat sealer 15 of the wrapping machine comprises a hot plate positioned forwardly of the side panels 31 and carried by the frame 16. The hot plate in the embodiment shown is a conventional structure and, therefore, is not further described herein. Both the wire cutter 14 and the heating element of the hot plate 15 are each connected to a suitable electrical source by conventional means which can include hand or foot operated switches, thermostats and the like.

OPERATION

To use the wrapping machine 10, the knobs 60 are unseated from the enlarged portions of the arcuate slots 56 and the dispenser 12 is pivoted so as to present at the guide roller 64 the desired sheet holder assembly. The tag of the film, previously folded under the corresponding sheet support bar 40 and tucked between the tag holder 54 and the sheet support bar 40, is pulled out and with both hands the film is pulled upwardly and over the guide roller 64, and placed on the wrapping table 13. An article to be packaged is then placed on the film and the film wrapped around it as desired. Thereafter the wrapped article is brought forwardly so as to bring the unneeded portion of the film against the hot wire cutter 14 which is at cutting temperature, whereby the film is cut. The tag of the film extending outwardly from the sheet holder assembly falls downwardly away from the wire cutter 14. However, because of the press of the press members 51 against the film on the sheet support bar 40, the film remains at the sheet holder assembly. Meanwhile, the wrapped article is placed so as to bring the loose end of the film wrapped about the article down on the heat sealer 15 and underneath the wrapped article so as to heat seal the loose end of the film to the package thus formed.

When it is desired to use film of a different width, the tag of the previously used film is tucked between the sheet end holder 54 and the corresponding sheet support bar 40, and the dispenser 12 is pivoted so as to bring the sheet holding assembly with the desired film into sheet dispensing position relative to the guide roller 64.

Thus, there is provided a wrapping machine capable of dispensing more than one film. In this connection, while this invention has been described relative to the dispensing of thermoplastic film, this invention in its broader aspects is not limited thereto, it being broadly applicable to flexible sheeting of all kinds, and in more specific aspects to flexible, thermoplastic sheeting.

The structure of the wrapping machine is simple, is inherently rugged, and can be built from readily available parts.

These and other features, advantages and specific embodiments of this invention will be readily apparent to those in the exercise of ordinary skill in the pertinent art after reading the foregoing disclosures. All of these specific embodiments are within the claimed subject matter unless otherwise expressly indicated. Also, while a specific embodiment of this invention has been described inconsiderable detail, variations and modifications of this embodiment can be effected without departing from the spirit and scope of the invention as disclosed and claimed.

What is claimed is:

1. An apparatus for dispensing at one place at least two flexible sheets from at least two supply rolls thereof comprising:
   a stationary frame, means on said frame for supporting said supply rolls, a dispenser comprising
   a. a pair of plates separated by at least the width of said sheets and disposed on said frame to confront opposite edges of said sheets;
   b. sheet support means for each of said sheets mounted on and extending between said plates transversely of said sheets;
   c. check means supported by said plates and arranged to bear against each of said sheets on said respective support means, said check means being movable away from said support means by said sheet when said sheet is pulled in a direction of withdrawal, but otherwise holding said sheet; and
   d. means for pivoting said plates relative to said frame and said roll support means on an axis parallel with said roll axes.

2. The dispenser of claim 1 including means for retaining said plates in any of a plurality of pivot orientations relative to said frame.

3. The dispenser of claim 2 including a guide roller, and wherein said plates are disposed so that in each of said plurality of pivot orientations, one of said sheet support means is adjacent said guide roll.

4. The dispenser of claim 3 including spacer rolls parallel with said supply rolls and spaced from said supply rolls for guiding said sheets from said rolls to said sheet support means.

5. The dispenser of claim 3 wherein said frame includes a generally horizontally-disposed table located back of said guide roll and a generally horizontally-disposed hot wire cutter disposed in front of said guide roll.

6. The dispenser of claim 5 wherein said frame includes a hot plate disposed in front of said cutter.

7. The dispenser of claim 3 including a tag holder disposed on each of said sheet support means for receiving and holding the tag of a sheet held on said respective sheet support means.

8. The dispenser of claim 7 wherein said sheet supporting means comprises a bar and said tag holder is arranged on the opposite side of said bar from said check means.

9. The dispenser of claim 8 wherein said tag holder comprises a coiled spring mounted under tension along the length of said support bar.

10. In a wrapping station having a wrapping position; means supporting at fixed axial positions a plurality of rotatable supply rolls of plastic film of different widths or other different characteristics; and a selector mechanism for presenting selected ones of said film to the wrapping position in any sequence as desired, said selector mechanism comprising: a plurality of squeeze assemblies for squeezing and holding a plurality of ends of film at spaced apart positions, there being a different squeeze assembly for each different end of film to be presented to the wrapping position; common support means for supporting said plurality of squeeze assemblies near the forward end of the wrapping position; and lever means secured to said common support means for moving said squeeze assemblies as a unit to carry the end of a selected one of said films to the wrapping position and to carry the end of a nonselected film away from the wrapping position while maintaining said supply rolls at their respective fixed axial positions.

11. Apparatus as claimed in claim 9 characterized in that common support means are mounted for pivotal movement about a pivot axis, and in that said squeeze assemblies are angularly disposed in said common support means relative to said pivot axis and adapted to move along arcuate paths about said pivot axis.

12. Apparatus as claimed in claim 11 further characterized in that each of said squeeze assemblies includes a support shelf over which the film is passed and a pressure roller mounted above said support shelf and adapted to press down on the film passing over said support shelf.

13. The apparatus as claimed in claim 11 further characterized in that each of said squeeze assemblies includes a support shelf over which the film is passed, and pressure means is mounted above said support shelf and adapted to press down on the film passing over said support shelf.

14. In a wrapping station having a wrapping position; means supporting at fixed axial positions a plurality of rotatable supply rolls of plastic film of different widths or other different characteristics; and a selector mechanism for presenting selected ones of said film to the wrapping position in any sequence as desired, said selector mechanism comprising; a plurality of squeeze assemblies for squeezing and holding a plurality of ends of film at spaced apart positions, there being a different squeeze assembly for each different end of film to be presented to the wrapping position; common support means for supporting said plurality of squeeze assemblies near the forward end of the wrapping position; and means secured to said common support means for moving said squeeze assemblies as a unit to carry the end of a selected one of said films to the wrapping position and to carry the end of a nonselected film away from the wrapping position while maintaining said supply rolls at their respective fixed axial positions.

15. In a wrapping station having a wrapping position; means supporting at fixed axial positions a plurality of rotatable supply rolls of plastic film of different widths or other different characteristics; and a selector mechanism for presenting selected ones of said film to the wrapping position in any sequence as desired, said selector mechanism comprising: a plurality of squeeze assemblies for squeezing and holding a plurality of ends of film at spaced apart positions, there being a different squeeze assembly for each different end of film to be presented to the wrapping position; common support means for supporting said plurality of squeeze assemblies near the forward end of the wrapping position; and manually operably means secured to said common support means for moving said squeeze assemblies as a unit to carry the end of a selected one of said films to the wrapping position while maintaining said supply rolls at their respective fixed axial positions.

16. In a wrapping station having a wrapping position; means supporting at fixed axial positions a plurality of rotatable supply rolls of plastic film of different widths or other different characteristics; and a selector mechanism for presenting selected ones of said film to the wrapping position in any sequence as desired, said selector mechanism comprising: a plurality of squeeze assemblies for squeezing and holding a plurality of ends of film at spaced apart positions, there being a different squeeze assembly for each different end of film to be presented to the wrapping position; common support means for supporting said plurality of squeeze assemblies near the forward end of the wrapping position; and handle means secured to said common support means for moving said squeeze assemblies as a unit to carry the end of a selected one of said films to the wrapping position and to carry the end of a nonselected film away from the wrapping position while maintaining said supply rolls at their respective fixed axial positions.

17. A machine for wrapping and heat sealing packages comprising: a framework, a platform for supporting a package to be wrapped mounted on and above said framework, means on said framework and disposed below said platform for rotatably supporting a plurality of rolls of thermoplastic wrapping material, a heated sealing surface mounted on said framework adjacent said platform, means defining an opening between the platform and the heated surface for the passage of the wrapping material, a carriage mounted on said framework in proximity to said opening, for movement with respect to said opening, said carriage including individual gripping means to grip and yieldably support the individual free ends of the wrapping material from said rolls, means for moving said carriage with respect to said opening, the movement of the carriage serving to present a selected free end of a given roll of said wrapping material at said opening, and a heated material severing means.

* * * * *